United States Patent Office 3,544,510
Patented Dec. 1, 1970

3,544,510
MERCAPTAL STABILIZED HALOGEN-CONTAINING RESINS

Christian H. Stapfer, Newtown, Pa., assignor to Cincinnati Milacron Chemicals, Inc., Reading, Ohio, a corporation of Ohio
No Drawing. Filed May 15, 1968, Ser. No. 729,456
Int. Cl. C08f 45/58
U.S. Cl. 260—45.75          5 Claims

ABSTRACT OF THE DISCLOSURE

Halogen-containing resins are stabilized with monomeric or polymeric mercaptals of the unit structure

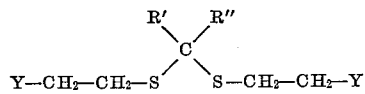

wherein Y is a —COOR or —OOCR group, and R, R', and R" are monovalent hydrocarbon groups, which mercaptals contain chemically bound or in intimate physical mixture an alkyl stannoic or alkyl thiostannoic acid.

---

The invention relates to halogen-containing resins containing an organotin sulfur composition as stabilizer against deterioration by heat and light.

Among the numerous types of compounds proposed for the stabilization of halogen-containing resins, organotin sulfur compounds including organotin mercaptides and mercapto esters have been found to be particularly efficient and have been commercially used to a steadily increasing extent.

However, these conventional types or organotin stabilizers present some well known drawbacks. A particular disadvantage is the need to apply rather high amounts, normally in the range of about 2 percent by weight of the resin, which renders them frequently unsuitable for rigid formulations where they may lower the heat distortion temperature and interfere with other desirable properties.

It is, therefore, a principal object of the invention to provide an organotin sulfur composition as stabilizer which imparts protection against deterioration by heat and light at considerably lower levels than conventional organotin mercapto stabilizers.

Other objects and advantages will be apparent from a consideration of the specification and claims.

The organotin sulfur compounds used in accordance with the invention corresponds to the formula (1)  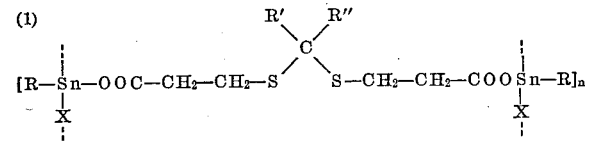

wherein X is oxygen or sulfur, and $n=1$ to $\infty$, or are mixtures of compounds (2)  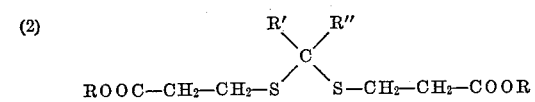

and/or (3)  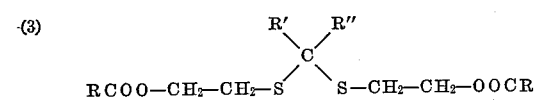

with 1 to 10, preferably about 5 percent by weight or about 0.1 mole percent, calculated on the mercaptal, of a stannoic or thiostannoic acid RSnOOH or RSnSSH. The stannoic and thiostannoic acid may also be used in form of their polymers $[RSnX_{1.5}]_m$ wherein X is oxygen or sulfur, and $m$ is a number between 2 and $\infty$.

In all said formulae, R is a monovalent hydrocarbon radical, derived from a monohydric or polyhydric substituted or unsubstituted aliphatic, alicyclic, or aromatic alcohol, preferably alkyl having 1 to 18 carbon atoms. R' and R" are hydrogen or different or generally the same alkyl, cycloalkyl, or alkaryl groups. Preferred are compounds in which R'+R" form together a pentamethylene or benzal group.

The compounds for Formula 1 are prepared by condensation of one mole of the corresponding mercaptals or mercaptols with 2 moles of an alkyl stannoic acid in a suitable solvent such as aliphatic alcohols or aromatic hydrocarbon solvents, e.g., toluene or butanol.

The compounds (2) which may be termed diester of S,S'-bis(carboxyethyl) mercaptans, can be prepared by condensation of R'R" ketones or aldehydes with a beta-mercapto propionic acid ester in the presence of an acid catalyst such as hydrochloric or para-toluenesulfonic acid.

The S,S'-bis(acyloxyethyl)mercaptal diesters of Formula 3 are prepared by condensation of R'R" ketones or aldehydes with β-mercaptoethanol followed by esterification with R acids. They may also be prepared by reacting R'R" gem-mercaptans with ethylene oxide followed by esterification with R acids.

In the above formulae, the stabilizers are all shown as derivatives of mercaptopropionic acid. Though these compounds are preferred, the mercaptopropionic acid may be replaced in certain cases by mercaptoacetic or higher mercapto acids.

Halogen-containing resins which can be stabilized by means of this invention are particularly vinyl chloride homopolymers and copolymers with other ethylenically unsaturated compounds, where the copolymers contain at least 50 percent of vinyl chloride units. Other halogen-containing resins which are similarly stabilized, are, e.g. vinylidene chloride resins, chlorinated polyolefins, and others. The stabilizers may also be used for natural or synthetic rubbers and for resins which do not contain halogen, where the conventional organotin sulfur stabilizers have proven to be useful additives for various purposes. Such resins are, e.g., polyolefins and ABS resins.

Polyvinyl chloride stabilized in accordance with this invention will contain tthe stabilizer in such amount as to provide for a tin content of at most 0.05 preferably 0.005 to 0.01 percent of tin, calculated on the resin. Generally, this will amount to at most 0.5, preferably 0.1 to 0.3 percent by weight of organotin sulfur composition. In certain cases where, in the organic sulfur compound, R is a high molecular weight radical such as stearyl, higher amounts of the sulfur compound can be used without ever exceeding 1.0 part per hundred. Calculated on tin and depending upon the molecular weight of the stabilizer, this is about ⅕ to ⅒ of the amount required for the same stabilizing effect of e.g. dibutyltin bis(isooctyl mercaptoacetate) which is one of the best organotin sulfur stabilizers which are commercially available at present.

This striking difference between the action of the known and the novel stabilizers disappears gradually when larger amounts are used. Thus, an addition of a stabilizer according to the invention in an amount of 1.25 percent by weight of tin, calculated on the resin, has about the same effect as a proportionally equivalent addition of tin, e.g., in the form of dibutyltin bis(isooctyl mercaptoacetate).

The following examples are given to illustrate the preparation of the novel stabilizers and their use.

EXAMPLE 1

A solution of 30 g. of cyclohexylidene-1,1-bis(mercaptopropionic acid) in 50 cc. of toluene was added slowly to a refluxing suspension of 42 g. of butyl stannoic acid in 100 cc. of toluene. The reflux was maintained until 3.6 g. of condensation water was separated by azeotropic distillation. After filtration the solvent was removed by evaporation and the resulting 67 g. of crosslinked poly[buyl stannoxy (cyclohexylidene-1,1-bis-mercaptopropionate)] was oven dried. The melting point of the compound was above 280° C.

0.1 part (=0.03% Sn) of said compound was added to a resin formulation which was a mixture of 100 parts of polyvinyl chloride resin (Geon 101–EP) and 0.5 parts of mineral oil as lubricant. The blend of said mixture with the stabilizer was milled for 5 minutes at 320° F. and sheeted. Samples cut from the sheets were baked in an air circulating oven at 370° F., removed from the oven at ten minutes intervals, and rated visually for discoloration.

From 0 to 30 minutes, the above formulation showed excellent early color with no degradation. At 40 minutes, degradation began and the sample turned brown after 50 minutes.

EXAMPLE 2

An identical performance as in Example 1 was obtained with a similar formulation stabilized with 0.4 p.p.h. of poly cyclohexylidene - 1,1 - bis(thiodiglycol mercaptopropionate) containing 5% of butyl stannoic acid dissolved therein; the mercaptal had the formula

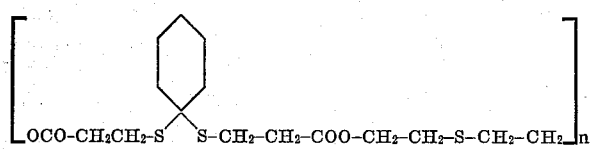

and had been prepared by polycondensation of thiodiglycol with cyclohexylidene - 1,1 - bis(mercaptopropionic acid), the latter being obtained by a simple mercaptol condensation of cyclohexanone with beta-mercaptopropionic acid. Calculated on the resin, the tin content in this case was only 0.009%.

EXAMPLE 3

The resin formulation of Example 1 was stabilized with 0.1 p.p.h. of poly [butyl stannoxy (benzylidene bis-mercaptopropionate)]. This stabilizer had the formula

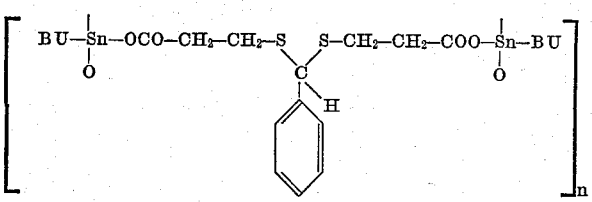

was prepared by reacting two moles of butylstannoic acid with one mole of the benzylidene α,α'-bis-mercaptopropionic acid, itself obtained by the standard procedure. The formulation was extruded in a one inch MPM extruder at 400° F. and 30 r.p.m. The extrudate was of excellent color and clarity, the output rate was 10 lbs./hour.

EXAMPLE 4

A blend of 100 parts of diamond alkali's PVC 40 resin, 2.5 parts of an acrylic processing aid, 0.75 part of a carboxylic ester wax, and 0.5 part of mineral oil was stabilized with 1.0 part of distearyl cyclohexylidene-1,1-bis-(mercaptopropionate) containing 10% of butyl stannoic acid and extruded on a one inch MPM extruder. At 400° F. and 30 r.p.m., an excellent, clear extrudate was obtained at a rate of 9.8 lbs./hour.

EXAMPLE 5

The same basic formulation was used as in Example 4 stabilized with 1.0 p.p.h. of distearyl cyclohexylidene-1,1 - bis(mercaptopropionate) containing respectively 10%, 5% and no butyl stannoic acid. The blends were milled and baked following the procedure of Example 1 and compared to an unstabilized formulation. The mercaptol alone retarded the initial degradation by 10 minutes and reduced further discoloration. The addition of 5% of butyl stannoic acid added 15 more minutes of good early color whereas the 10% addition further enhanced it by only 5 more minutes indicating an optimum plateau somewhere between 5 and 10% butylstannoic acid.

EXAMPLE 6

One hundred parts of Geon 103 EP polyvinyl chloride resin, ten parts of dioctyl phthalate, 0.5 part of mineral oil and the stabilizer, were milled at 320° F. for 5 minutes, then baked in an oven at 370° F. Samples were removed from the oven at 10 minutes intervals and compared for their discoloration. The stabilizer used in this system was dibutyl (cyclohexylidene-1,1-bis[mercaptopropionate]) +10% butyl stannoic acid. The amount of stabilizer was varied from 1.0 p.p.h. to 0.05 p.p.h. (0.013 to 0.0065% Sn) in order to determine the influence of the stabilizer level on the stabilizing activity. A perfect early color was maintained from 0 to 30 minutes for the systems containing, respectively, 1.0, 0.5, 0.2 and 0.1 p.p.h. of the stabilizer. The degradation was identical for the 1.0, 0.5, 0.2 and 0.1 p.p.h. levels. The difficulty to disperse properly the 0.05 p.p.h. of stabilizer in the resin accounted for a poorer performance at that level.

EXAMPLE 7

A formulation as used in Examples 4 and 5 was stabilized with 0.3 p.p.h. of polycyclohexylidene-1,1-bis(thiodiglycol mercaptopropionate) containing 5% of butylthiostannoic acid. An extrudate of excellent quality was obtained at a rate of 10.1 lbs./hour at 400° F. and 30 r.p.m.

EXAMPLE 8

A formulation as used in Example 7 was stabilized with 0.5 part of cyclohexane-1,1-bis(mercaptoethyl stearate) containing 10% of butyl stannoic acid. It was extruded on a one inch MPM extruder. At 400° F. and 30 r.p.m., an excellent, clear extrudate was obtained at a rate of 10.0 lbs./hour.

I claim:
1. A heat resistant composition containing as a major constitutent a halogen-containing resin selected from the group consisting of polyvinyl chloride, copolymers containing at least 50% vinyl chloride with ethylenically unsaturated compounds, chlorinated polyolefins and vinylidene chloride resins and as a stabilizer a mercaptal having a unit formula selected from the group consisting of

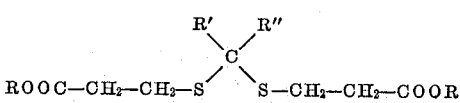

and

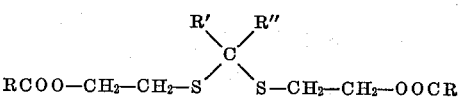

wherein R is a monovalent hydrocarbon group and R' and R", when taken individually, are selected from the group consisting of hydrogen, alkyl, cycloalkyl, alkaryl and phenyl groups and when taken together are pentamethylene and a stannoic acid selected from the group consisting of alkyl stannoic and alkylthiostannoic acids.

2. A composition as claimed in claim 1 wherein R'+R" form together a pentamethylene radical or when taken individually R' is hydrogen and R" is the phenyl radical.

3. A composition as claimed in claim 1 wherein said stabilizer is a mixture of said mercaptal with 1 to 10 percent by weight of said stannoic acid.

4. A composition as claimed in claim 1 wherein said halogen-containing resin is a rigid vinyl chloride resin and said stabilizer is used in an amount corresponding to a tin content of less than 0.01 percent, calculated on the resin.

5. A heat resistant composition containing as a major constituent a halogen-containing resin selected from the group consisting of polyvinyl chloride, copolymers containing at least 50% vinyl chloride with ethylenically unsaturated compounds, chlorinated polyolefins and vinylidene chloride resins and as a stabilizer a cross-linked polymeric monoalkyl tin compound prepared by the condensation of 1 mole of a mercapto compound corresponding to the formula $$\text{HOOC—CH}_2\text{—CH}_2\text{—S} \diagdown \underset{\text{C}}{\overset{R' \quad R''}{\diagup\diagdown}} \diagup \text{S—CH}_2\text{—CH}_2\text{—COOH}$$

wherein R' and R", when taken individually, are selected from the group consisting of hydrogen, alkyl, cycloalkyl, alkaryl and phenyl groups and when taken together are pentamethylene with two moles of an alkyl stannoic acid.

References Cited

UNITED STATES PATENTS

| | | | |
|---|---|---|---|
| 3,021,302 | 2/1962 | Frey | 260—45.75 |
| 3,196,129 | 7/1965 | Hechenbleikner | 260—45.75 |

DONALD E. CZAJA, Primary Examiner

V. P. HOKE, Assistant Examiner

U.S. Cl. X.R.

260—406, 45.85, 429.7